United States Patent [19]
Watanabe

[11] Patent Number: 6,043,773
[45] Date of Patent: Mar. 28, 2000

[54] VEHICLE-MOUNTED RADAR APPARATUS

[75] Inventor: Masahiro Watanabe, Tokyo, Japan

[73] Assignee: Mitsubishi Denki Kabushiki Kaisha, Tokyo, Japan

[21] Appl. No.: 09/008,545

[22] Filed: Jan. 16, 1998

[30] Foreign Application Priority Data

Jul. 15, 1997 [JP] Japan .................................. 9-189516

[51] Int. Cl.[7] .................................................. G01S 13/93
[52] U.S. Cl. .............................. 342/71; 342/70; 342/158
[58] Field of Search ................................ 342/70, 71, 72, 342/78, 158; 340/435, 903

[56] References Cited

U.S. PATENT DOCUMENTS

| | | | |
|---|---|---|---|
| 5,579,010 | 11/1996 | Iihoshi et al. | 342/70 |
| 5,652,589 | 7/1997 | Ono et al. | 342/70 |
| 5,694,130 | 12/1997 | Suzuki et al. | 342/70 |

FOREIGN PATENT DOCUMENTS 8211145  8/1996  Japan ............................. G01S 13/60

Primary Examiner—Ian J. Lobo
Attorney, Agent, or Firm—Sughrue, Mion Zinn Macpeak & Seas, PLLC

[57] ABSTRACT

A variable-scanning-speed mechanical driving unit is provided for providing control in such a manner as to acquire data while continuously changing in a range of a scanning angle the direction of an antenna unit for transmission and reception of radio waves. A so-called warning mode which is primarily aimed at the prevention of a collision is set, and a data updating period is shortened by making the scanning speed for transmitted radio waves and received radio waves so relatively high as to shorten the data updating period. In a case where a so-called follow-up mode which is primarily aimed at follow-up traveling is set, the scanning speed for transmitted radio waves and received radio waves is made relatively low so as to extend the data updating period. Accordingly, the vehicle-mounted radar apparatus can be used as a following-distance warning apparatus or a following-distance controlling apparatus, to make it possible to obtain such as resolutions of the relative distance and relative velocity and a data updating period which are optimally suited for one's own vehicle and a driver in correspondence with the situation during actual use of the apparatus.

3 Claims, 5 Drawing Sheets

VEHICLE-MOUNTED RADAR APPARATUS

BACKGROUND OF THE INVENTION

The present invention relates to a vehicle-mounted radar apparatus.

A conventional vehicle-mounted radar apparatus as shown in FIG. 5 is known.

In the drawing, an antenna transmission/reception section 21 is comprised of an antenna unit 22, a coupler 23, a voltage controlled oscillator 24, a frequency conversion unit 25, and a gain control unit 26. Further, a signal processing section 27 is comprised of a modulated-signal control unit 28, a frequency analysis unit 29, and an arithmetic-operation control unit 30. Reference numeral 31 denotes a mechanical driving unit.

In the vehicle-mounted radar apparatus configured as described above, the modulated-signal control unit 28 supplies a modulation signal to the voltage controlled oscillator 24 to allow the voltage controlled oscillator 24 to generate relatively high frequency radio waves subjected to linear frequency modulation. The relatively high frequency radio waves subjected to linear frequency modulation and outputted from the voltage controlled oscillator 24 are radiated to space from the antenna unit 22 via the coupler 23. Meanwhile, received radio waves from an object which reflects transmitted radio waves are received by the antenna unit 22 and are supplied to the frequency conversion unit 25.

In the frequency conversion unit 25, part of the transmitted radio waves from the coupler 23 and the received radio waves from the antenna unit 22 are mixed, and a relatively low frequency signal is generated. An amount of transition of a frequency based on the time lag of radio waves corresponding to the distance to the object and an amount of transition of a Doppler frequency based on the moving velocity in a case where the object is moving are added to the frequency of the received radio waves. Accordingly, information such as the relative distance to the object and the relative velocity are multiplexed with the relatively low frequency signal generated by the frequency conversion unit 25. The power of this multiplexed signal is set by the gain control unit 25 in such a manner as to assume an appropriate magnitude for each scanning of the transmitted radio waves and the transmitted radio waves by the mechanical driving unit 31, and the arithmetic-operation control unit 30 computes the relative distance, the relative velocity, and the like with respect to the frequency data from the frequency analysis unit 29.

The above-described radar apparatus is used for a following-distance warning apparatus which informs the driver of a danger by issuing a warning when a distance with a preceding vehicle has become shorter than a safe following distance and the danger of a collision has become heightened, or for a following-distance controlling apparatus for effecting follow-up traveling by keeping a safe following distance with a preceding vehicle.

Further, a technique for improving the distance resolution by changing a modulation period and a technique for facilitating pairing when an identical target is determined are disclosed in publications which are cited below as conventional techniques.

Namely, Unexamined Japanese Patent Publication 8-136647 discloses a technique in which the normalized value of (distance value/beat frequency) is made small by making a modulation period short, so as to improve the distance resolution.

In addition, Unexamined Japanese Patent Publication 8-189965 discloses a technique in which a modulation period is made long during high-speed traveling to widen the range of a detection distance, and the modulation period is made short during close-distance detection to restrict the detection range to the close distance, thereby improving the distance resolution.

Further, Unexamined Japanese Patent Publication 8-211145 discloses a technique in which if the modulation period is made short, the velocity resolution declines, but the difference in amplitude between reflected signals from a target which are obtained during a rise and a fall in frequency modulation becomes small, so that when an identical target is determined, pairing is facilitated by combining the same amplitudes.

In a vehicle-mounted radar apparatus, rather than fixedly setting resolutions of such as the relative distance and the relative velocity and a time period such as the data updating period, it is generally preferable to set optimum values in correspondence with the situation during actual use of the apparatus. For example, there are cases where the primary object is to detect a vehicle which is likely to collide against one's own vehicle among a group of preceding vehicles, and where an attempt is made to follow a vehicle among a group of preceding vehicles. Here, if the mode of the former case is referred to as a warning mode, it is important to place priority on shortening a data updating period concerning information on such as the relative distance, the relative velocity, and the like, whereas if the mode of the latter case is referred to as a follow-up mode, it is important to place priority on obtaining high-performance resolutions of the relative distance, the relative velocity, and the like.

With conventional vehicle-mounted radar apparatuses, however, resolutions of such as the relative distance and the relative velocity and the time period such as the data updating period are set fixedly, so that there has been a problem that it is impossible to set optimum values in correspondence with the warning mode and the follow-up mode.

SUMMARY OF THE INVENTION

The present invention has been devised to overcome the above-described problems, and its object is to provide a vehicle-mounted radar apparatus which, in the use of a vehicle-mounted radar apparatus as a following-distance warning apparatus or a following-distance controlling apparatus, is capable of outputting parameters of data, i.e., such as resolutions of the relative distance and relative velocity and the data updating period, which are optimally suited for one's own vehicle and the driver in correspondence with the situation during actual use of the apparatus.

In accordance with the present invention, there is provided a vehicle-mounted radar apparatus for acquiring data while continuously changing in a range of a scanning angle a direction of an antenna unit for transmission or reception of radio waves in space, comprising: a variable-scanning-speed mechanical driving unit for increasing the scanning speed in the case of a warning mode aimed at the prevention of a collision, and for decreasing the scanning speed in the case of a follow-up mode aimed at follow-up traveling.

Furthermore, in accordance with the present invention, there is provided a vehicle-mounted radar apparatus for acquiring data for each direction while continuously switching over in a range of a scanning angle a direction of an antenna unit for transmission or reception of radio waves in space to a plurality of fixed directions, comprising: a switching unit for shortening a data acquisition time per direction in the case of a warning mode aimed at the prevention of a collision, and for extending the data acquisition time per direction in the case of a follow-up mode aimed at follow-up traveling.

DETAILED DESCRIPTION OF THE PREFERRED EMBODIMENTS

First Embodiment

Figure 1:
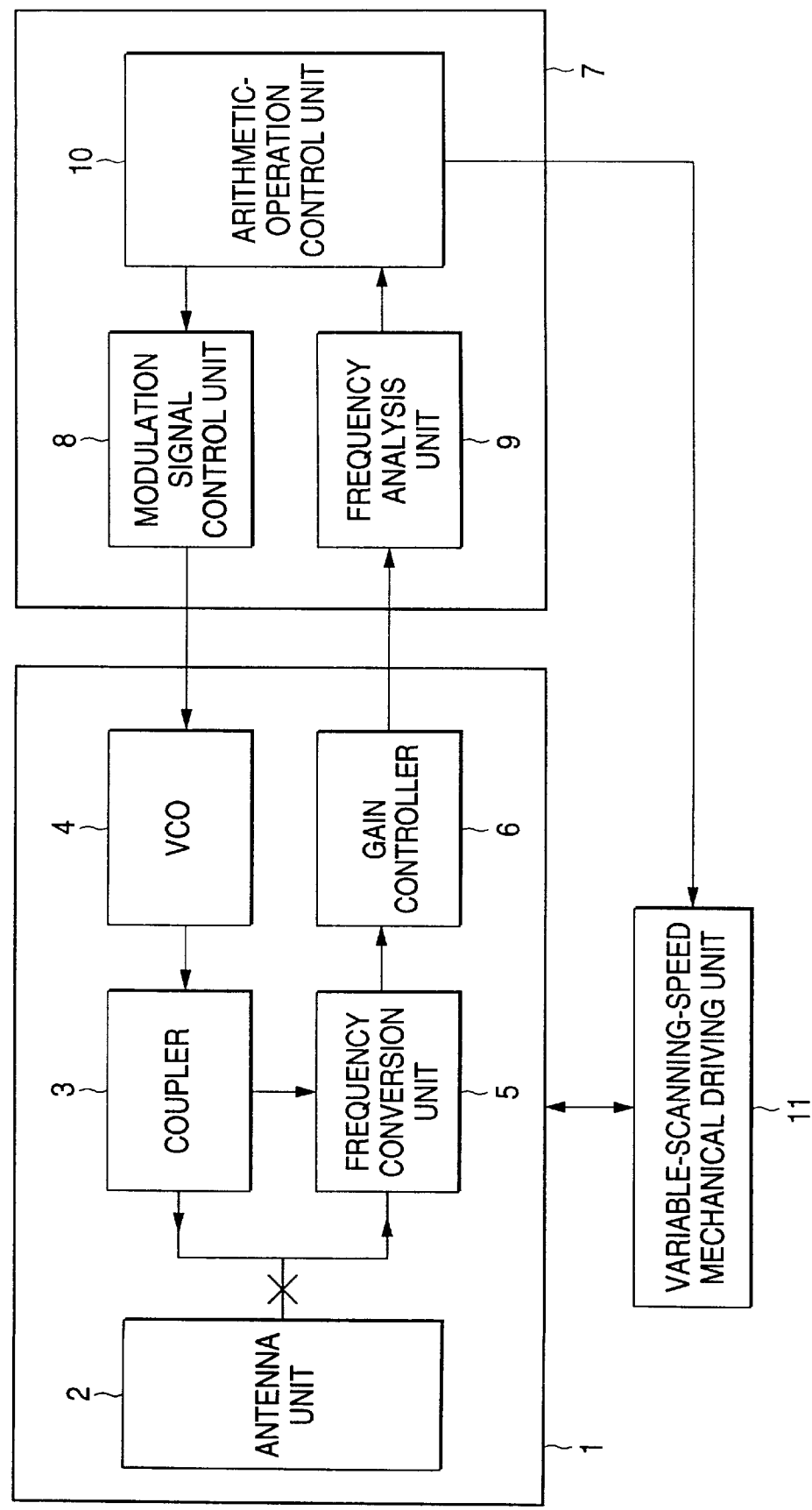
FIG. 1 is a schematic diagram illustrating a vehicle-mounted radar apparatus in accordance with a first embodiment of the present invention.

FIG. 1 is a schematic diagram illustrating a vehicle-mounted radar apparatus in accordance with an embodiment of the present invention. In the drawing, an antenna transmission/reception section 1 is comprised of an antenna unit 2, a coupler 3, a voltage controlled oscillator 4, a frequency conversion unit 5, and a gain control unit 6. Further, a signal processing section 7 is comprised of a modulated-signal control unit 8, a frequency analysis unit 9, and an arithmetic-operation control unit 10.

In addition, the scanning speed for transmitted radio waves and received radio waves is adapted to be changeable by a variable-scanning-speed mechanical driving unit 11, whereby the direction of transmission and reception of radio waves is continuously changed within a range of the scanning angle.

Next, a description will be given of the operation.

The modulated-signal control unit 8 supplies a modulation signal to the voltage controlled oscillator 4 to allow the voltage controlled oscillator 4 to generate relatively high frequency radio waves subjected to linear frequency modulation. The relatively high frequency radio waves subjected to linear frequency modulation and outputted from the voltage controlled oscillator 4 are radiated to space from the antenna unit 2 via the coupler 3. Meanwhile, received radio waves from an object which reflects transmitted radio waves are received by the antenna unit 2 and are supplied to the frequency conversion unit 5. In the frequency conversion unit 5, part of the transmitted radio waves from the coupler 3 and the received radio waves from the antenna unit 2 are mixed, and a relatively low frequency signal is generated. An amount of transition of a frequency based on the time lag of radio waves corresponding to the distance to the object and an amount of transition of a Doppler frequency based on the moving velocity in a case where the object is moving are added to the frequency of the received radio waves.

Accordingly, information such as the relative distance to the object and the relative velocity are multiplexed with the relatively low frequency signal from the frequency conversion unit 5. The power of this multiplexed signal is set by the gain control unit 6 in such a manner as to assume an appropriate magnitude for each scanning of the transmitted radio waves and the transmitted radio waves by the variable-scanning-speed mechanical driving unit 11, and the arithmetic-operation control unit 10 computes the relative distance, the relative velocity, and the like with respect to the frequency data from the frequency analysis unit 9. In addition, the arithmetic-operation control unit 10 effects control so as to obtain data by continuously changing the direction of transmission and reception of radio waves within a range of the scanning angle by means of the variable-scanning-speed mechanical driving unit 11.

Next, a description will be given of a method of computing the relative distance and the relative velocity.

Figure 2:
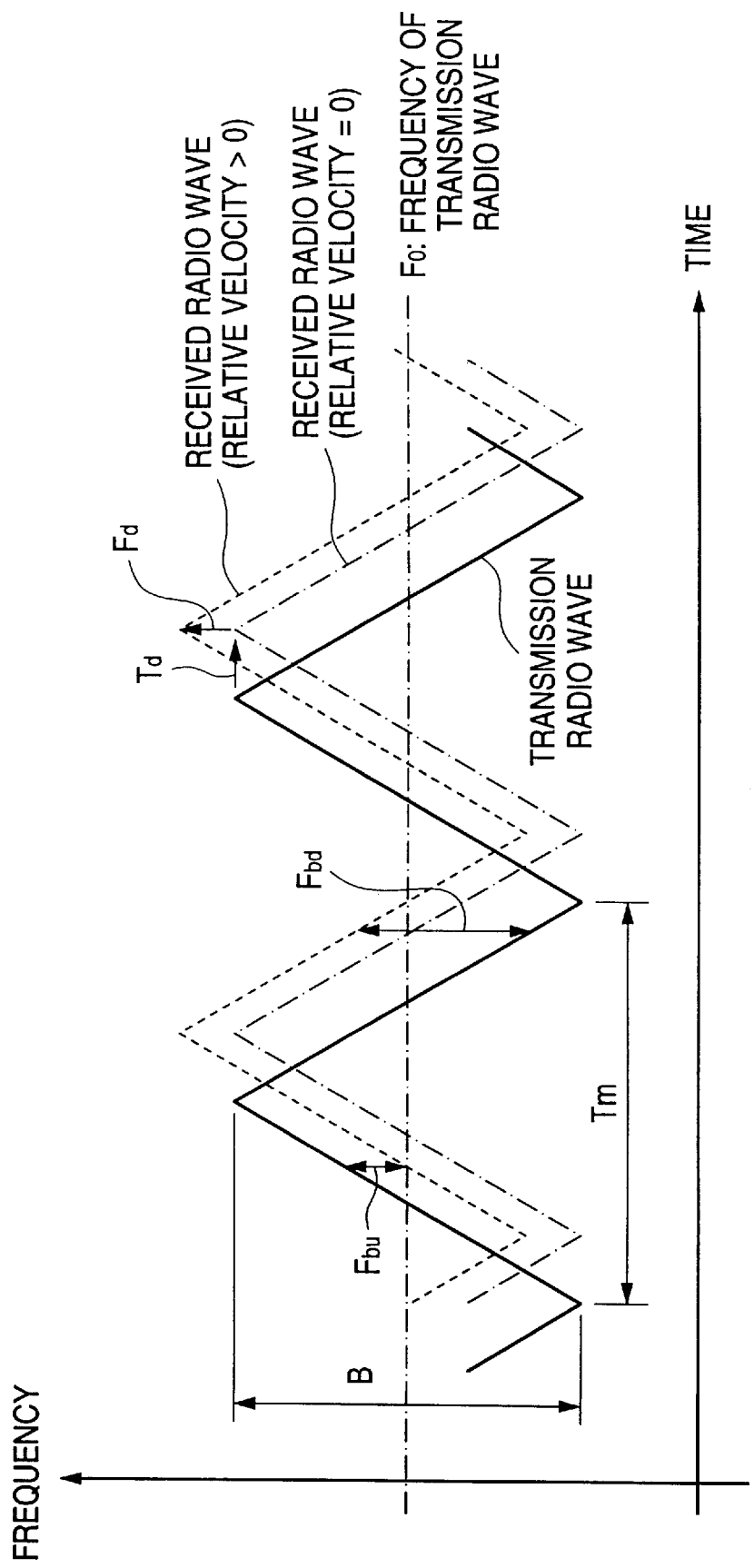
FIG. 2 is an explanatory diagram illustrating a method of computing the relative distance and the relative velocity by the vehicle-mounted radar apparatus in accordance with the present invention.

FIGS. 2 shows one example of computing the relative distance and the relative velocity by using the above-described radar apparatus.

In the drawing, the meanings of the symbols are as follows.

C: light velocity=$3.0 \times 10^8$ m/s $\lambda$: wavelength of a transmitted radio wave As an example, if a fundamental frequency F0 of the transmitted radio wave=60 GHz, then $1=5.0 \times 10^{-3}$ m.

B: frequency sweep bandwidth

Time delay Td with respect to the relative distance R

Td=2R/C

Doppler frequency Fd with respect to the relative velocity V=2V/$\lambda$

Fbu: frequency difference between a transmitted signal and a received signal during a frequency rise Fbd: frequency difference between a transmitted signal and a received signal during a frequency drop Tm: a frequency modulation period Accordingly, the relative distance R in a case where an object which reflects the radio wave has no relative velocity is represented as follow.

$$Fbu=Fbd=(B/(Tm/2))\cdot(2R/C)=4\cdot B\cdot R/Tm\cdot C$$

Therefore, $$R=(Tm\cdot C/4\cdot B)\cdot Fbu(=Fbd) \quad (1)$$

In addition, the relative distance and the relative velocity in a case where an object which reflects the radio wave has a relative velocity is represented as follow.

$$Fbu = (B/(Tm/2))\cdot(2R/C) - 2V/\lambda$$
$$= 4\cdot B\cdot R/Tm\cdot C - 2V/\lambda, \text{ and}$$
$$Fbd = (B/(Tm/2))\cdot(2R/C) + 2V/\lambda$$
$$= 4\cdot B\cdot R/Tm\cdot C + 2V/\lambda,$$

Therefore, $$R=(Tm\cdot C/8\cdot B)\cdot(Fbu+Fbd) \quad (2)$$

$$V=(\lambda/4)\cdot(Fbu-Fbd) \quad (3)$$

As for the resolutions of the relative distance and the relative velocity, if it is assumed that the frequency resolution $\Delta F$ (=1/(Tm/2)) is equal to $4\cdot B\cdot R/Tm\cdot C$ or $2V/\lambda$, and that the distance resolution is $\lambda R$ and the velocity resolution is $\lambda V$, since $\Delta F\ (=1/(Tm/2))=4\cdot B\cdot \Delta R/Tm\cdot C$, $$\Delta R=C/(2\cdot B) \quad (4)$$

since $\Delta F\ (=1/(Tm/2))=2\Delta V/\lambda$, $$\Delta V=\lambda/Tm \quad (5)$$

Accordingly, for example, since $$B=C/(2\cdot \Delta R)=3.0\times 10^8/(2\times 0.5)=3.0\times 10^8,$$

in order to obtain $\Delta R=0.5$ m, it suffices if B=300 MHz. In addition, since $$Tm=\lambda/\Delta V=5.0\times 10^{-3}/(1\times 3.6)=18\times 10^{-3},$$

in order to obtain $\Delta V=1$ km/h, it suffices if Tm=18 msec.

Next, referring to FIG. 3, a description will be given of a method of obtaining data while continuously changing the direction of transmission and reception of radio waves within a range of the scanning angle.

Figure 3:
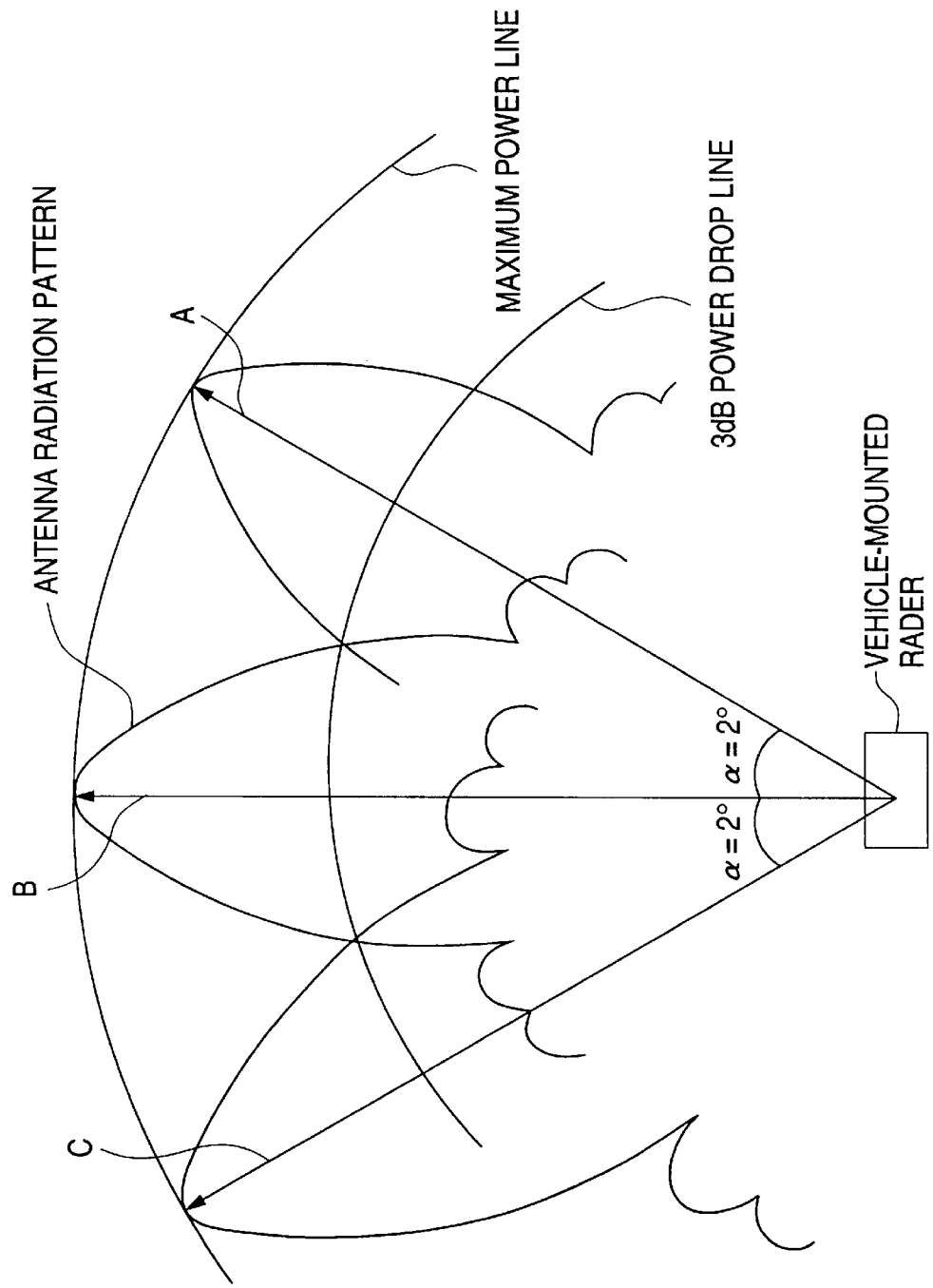
FIG. 3 is an explanatory diagram illustrating a method of scanning transmitted radio waves and received radio waves by the vehicle-mounted radar apparatus in accordance with the present invention.

In the case of the above-described vehicle-mounted radar apparatus, a setting is provided such that, in the scanning of the transmitted radio waves and received radio waves, the antenna unit is moved by an angle corresponding to an arbitrary power dropping point, e.g., a 3 dB power dropping point (in which case the angle corresponds to $\alpha=2°$ in FIG. 3), in an antenna radiation pattern during a time period corresponding to, for instance, a frequency modulation period Tm, and data is obtained by effecting scanning for a time period corresponding to a plurality of frequency modulation periods Tm during one scanning period (in FIG. 3, one scanning period is a period corresponding to 3 Tm).

During a warning mode, for example, if the distance resolution is set to a relatively coarse distance resolution $\Delta R=1$ m in accordance with Formula (4), a necessary frequency modulation bandwidth B becomes 150 MHz, and if the velocity resolution is set to a relatively coarse velocity resolution $\Delta V=2$ km/h in accordance with Formula (5), a necessary frequency modulation period Tm becomes 9 msec. Thus in a case where the antenna unit is moved by an angle corresponding to a 3 dB power dropping point in the antenna radiation pattern, scanning is effected 2° in the horizontal direction in 9 msec. Since relatively speedy scanning can be realized, it is possible to shorten the data updating period, and since a large amount of information can be acquired within a short time, these settings are appropriate for the warning mode.

During a follow-up mode, for example, if the distance resolution is set to a relatively fine distance resolution $\Delta R=0.5$ m in accordance with Formula (4), a necessary frequency modulation bandwidth B becomes 300 MHz, and if the velocity resolution is set to a relatively fine velocity resolution $\Delta V=1$ km/h in accordance with Formula (5), a necessary frequency modulation period Tm becomes 18 msec. Thus in a case where the antenna unit is moved by the angle corresponding to the 3 dB power dropping point in the antenna radiation pattern, scanning is effected 2° in the horizontal direction in 18 msec. Since scanning becomes relatively slow, the data updating period becomes long. However, high-performance resolutions can be realized for the relative distance and relative velocity, so that these settings are appropriate for the follow-up mode.

Thus, in a case where the mode is set in the so-called warning mode which is primarily aimed at the prevention of a collision, a combination of making the frequency modulation period Tm relatively short and making the frequency modulation bandwidth B relatively small (both or either one of them is applied) is adopted, thereby making the scanning speed for transmitted radio waves and received radio waves relatively high and shortening the data updating period. Meanwhile, in a case where the mode is set in the so-called follow-up mode which is primarily aimed at follow-up traveling, a combination of making the frequency modulation period Tm relatively long and making the frequency modulation bandwidth B relatively large (both or either one of them is applied) is adopted, thereby making the scanning speed for transmitted radio waves and received radio waves relatively low and extending the data updating period.

As described above, by providing the variable-scanning-speed mechanical driving unit 11, control is provided so as to obtain data while continuously changing the direction of transmission and reception of radio waves within a range of the scanning angle. Hence, it becomes possible to obtain parameters of data, i.e., such as resolutions of the relative distance and relative velocity and the data updating period, which are optimally suited for one's own vehicle and the driver in correspondence with the situation during actual use of the apparatus.

Second Embodiment

Figure 4:
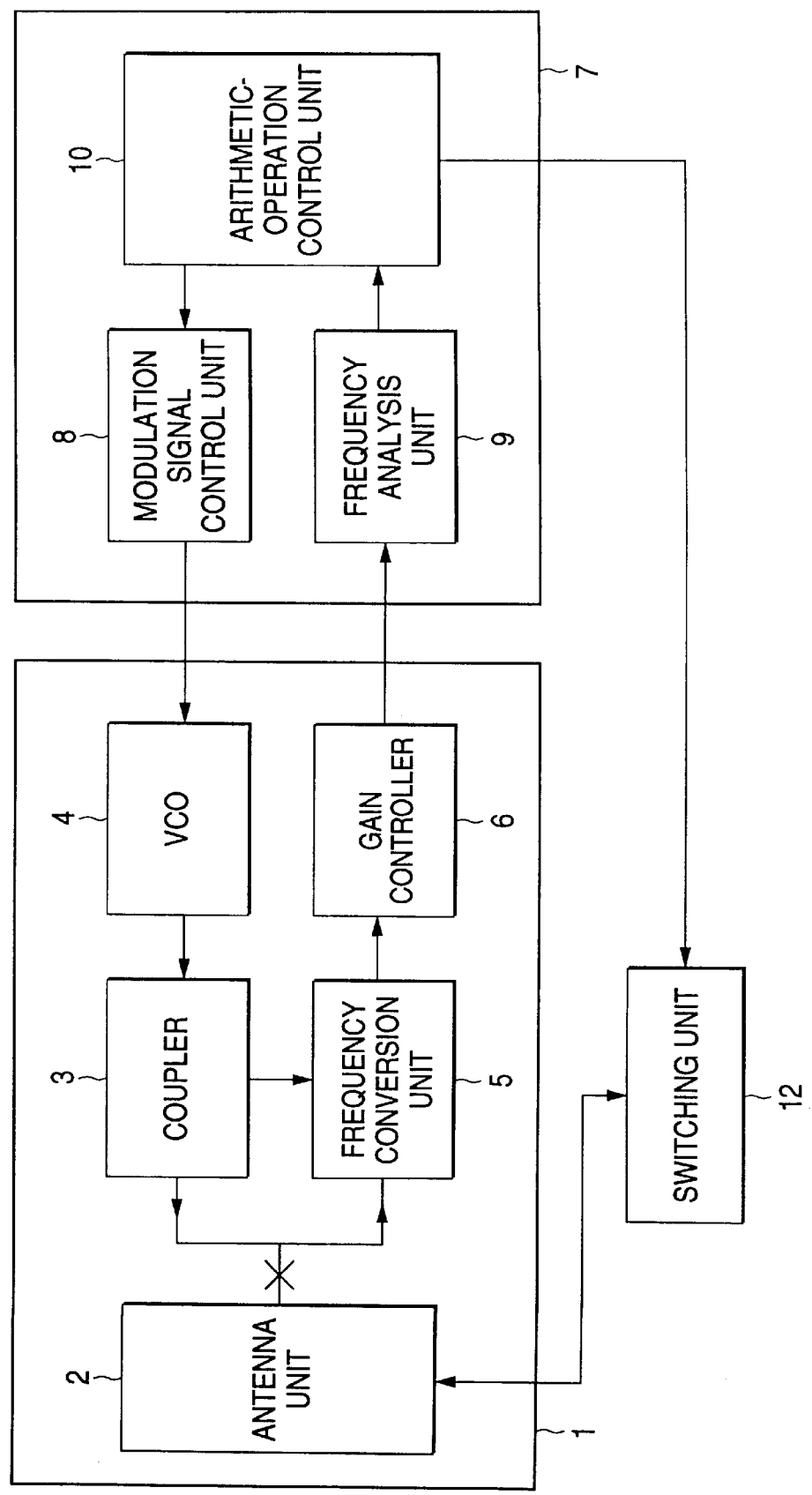
FIG. 4 is a schematic diagram illustrating the vehicle-mounted radar apparatus in accordance with a second embodiment of the present invention.
Figure 5:
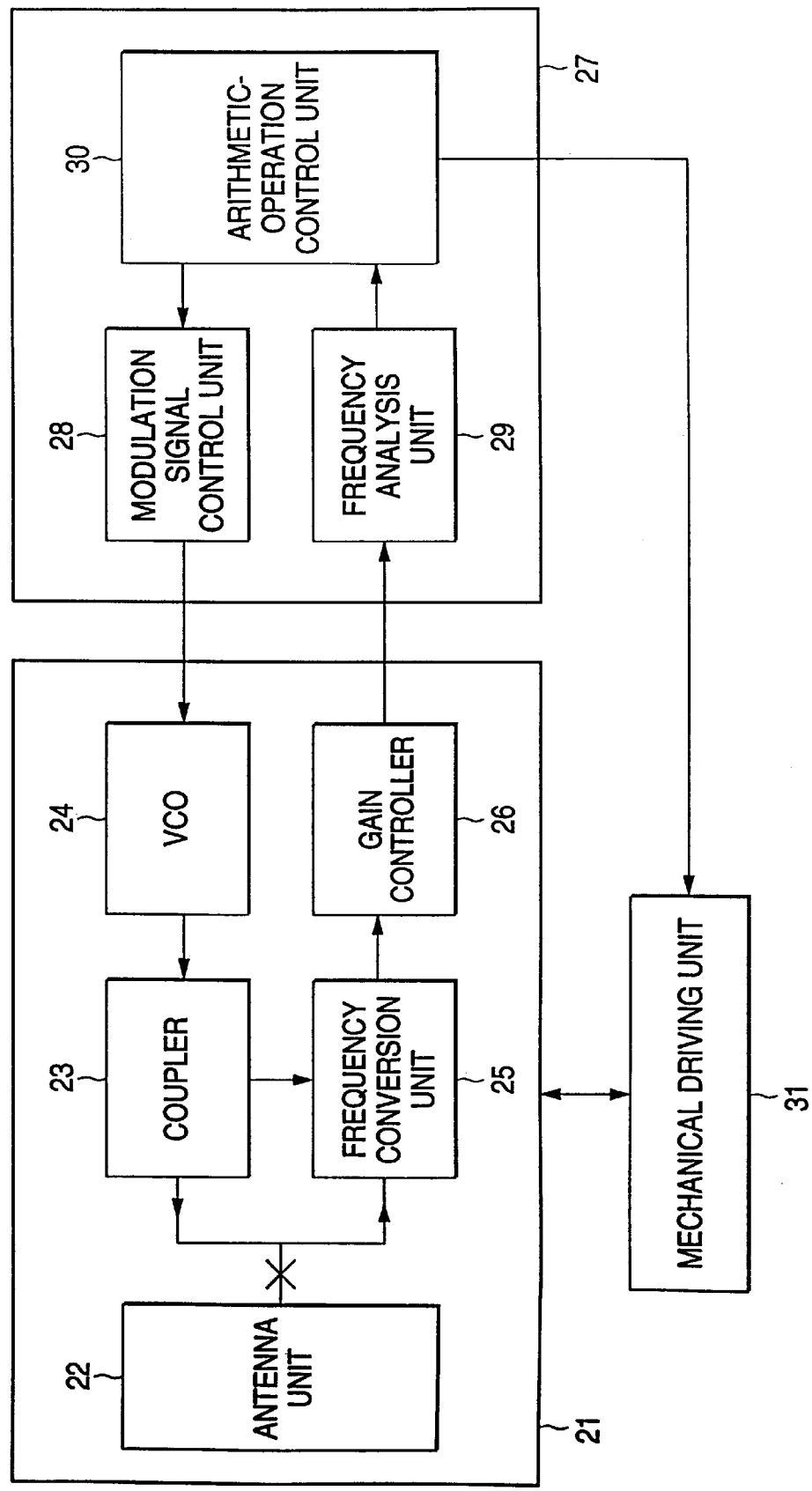
FIG. 5 is a schematic diagram illustrating a conventional vehicle-mounted radar apparatus.

FIG. 4 is a schematic diagram illustrating a vehicle-mounted radar apparatus in accordance with a second embodiment of the present invention. In the drawing, the antenna transmission/reception section 1 is comprised of the antenna unit 2, the coupler 3, the voltage controlled oscillator 4, the frequency conversion unit 5, and the gain control unit 6. Further, the signal processing section 7 is comprised of the modulated-signal control unit 8, the frequency analysis unit 9, and the arithmetic-operation control unit 10.

Here, in this embodiment, instead of the aforementioned mechanical driving unit 11, a switching unit 12 is provided for providing control so as to obtain data for each direction while intermittently switching over the direction of transmission and reception of radio waves to a plurality of fixed directions within a range of the scanning angle.

Next, a description will be given of the operation.

The modulated-signal control unit 8 supplies a modulation signal to the voltage controlled oscillator 4 to allow the voltage controlled oscillator 4 to generate relatively high frequency radio waves subjected to linear frequency modulation. The relatively high frequency radio waves subjected to linear frequency modulation and outputted from the voltage controlled oscillator 4 are radiated to space from the antenna unit 2 via the coupler 3. Meanwhile, received radio waves from an object which reflects transmitted radio waves are received by the antenna unit 2 and are supplied to the frequency conversion unit 5. In the frequency conversion unit 5, part of the transmitted radio waves from the coupler 3 and the received radio waves from the antenna unit 2 are mixed, and a relatively low frequency signal is generated. An amount of transition of a frequency based on the time lag of radio waves corresponding to the distance to the object and an amount of transition of a Doppler frequency based on the moving velocity in a case where the object is moving are added to the frequency of the received radio waves.

Accordingly, information such as the relative distance to the object and the relative velocity are multiplexed with the relatively low frequency signal from the frequency conversion unit 5. The power of this multiplexed signal is set by the gain control unit 6 in such a manner as to assume an appropriate magnitude for each scanning of the transmitted radio waves and the transmitted radio waves by the switching unit 12, and the arithmetic-operation control unit 10 computes the relative distance, the relative velocity, and the like with respect to the frequency data from the frequency analysis unit 9. In addition, the arithmetic-operation control unit 10 effects control so as to obtain data for each direction by switching over the direction of transmission and reception of radio waves to a plurality of fixed directions within a range of the scanning angle by means of the switching unit 12.

Next, a description will be given of a method of providing control so as to obtain data for each direction by switching over the direction of transmission and reception of radio waves to a plurality of fixed directions (in the directions of A, B, and C in FIG. 3) within a range of the scanning angle by means of the switching unit 12.

In the case of the above-described vehicle-mounted radar apparatus, a setting is provided such that, in the scanning of the transmitted radio waves and received radio waves, the direction is intermittently switched over for each angle corresponding to an arbitrary power dropping point, e.g., a 3 dB power dropping point (in which case the angle corresponds to $\alpha=2°$ in FIG. 3), in the antenna radiation pattern during each time period corresponding to, for instance, the frequency modulation period Tm, and data is obtained by effecting scanning for a time period corresponding to a plurality of frequency modulation periods Tm during one scanning period (in FIG. 3, one scanning period is a period corresponding to 3 Tm).

During the warning mode, for example, if the distance resolution is set to a relatively coarse distance resolution $\Delta R=1$ m in accordance with Formula (4), a necessary frequency modulation bandwidth B becomes 150 MHz, and if the velocity resolution is set to a relatively coarse velocity resolution $\Delta V=2$ km/h in accordance with Formula (5), a necessary frequency modulation period Tm becomes 9 msec. Thus in a case where the antenna unit is moved by an angle corresponding to a 3 dB power dropping point in the antenna radiation pattern, data is obtained by moving the antenna unit in units of 2° in the horizontal direction in 9 msec. Since data acquisition can be realized relatively speedily in the range of the scanning angle, it is possible to shorten the data updating period, and since a large amount of information can be acquired within a short time, these settings are appropriate for the warning mode.

During the follow-up mode, for example, if the distance resolution is set to a relatively fine distance resolution $\Delta R=0.5$ m in accordance with Formula (4), a necessary frequency modulation bandwidth B becomes 300 MHz, and if the velocity resolution is set to a relatively fine velocity resolution $\Delta V=1$ km/h in accordance with Formula (5), a necessary frequency modulation period Tm becomes 18 msec. Thus in a case where the antenna unit is moved by the angle corresponding to the 3 dB power dropping point in the antenna radiation pattern, data is obtained for each 2° in the horizontal direction in 18 msec. Although the data updating period becomes long, high-performance resolutions can be realized for the relative distance and relative velocity, so that these settings are appropriate for the follow-up mode.

Thus, instead of the mechanical driving unit, the switching unit is provided for providing control so as to obtain data for each direction while intermittently switching over the direction of transmission and reception of radio waves to a plurality of fixed directions within a range of the scanning angle. Further, in the warning mode, a combination of making the frequency modulation period Tm relatively short and making the frequency modulation bandwidth B relatively small (both or either one of them is applied) is adopted, thereby relatively shortening the data acquisition time per direction and shortening the data updating period. Meanwhile, in the follow-up mode, a combination of making the frequency modulation period Tm relatively long and making the frequency modulation bandwidth relatively large (both or either one of them is applied) is adopted, thereby relatively extending the data acquisition time per direction and extending the data updating period.

As described above, since the switching unit 13 is provided instead of the mechanical driving unit, it is possible to attain a compact and simplified apparatus as compared with a case where the mechanical driving unit is provided. At the same time, since control is provided so as to obtain data for each direction while intermittently switching over the direction of transmission and reception of radio waves to a plurality of fixed directions within a range of the scanning angle, it becomes possible to obtain parameters of data, i.e., such as resolutions of the relative distance and relative velocity and the data updating period, which are optimally suited for one's own vehicle and the driver in correspondence with the situation during actual use of the apparatus.

In accordance with the vehicle-mounted radar apparatus according to claim 1 of the present invention, data is acquired while continuously changing in a range of a scanning angle a direction of an antenna unit for transmission or reception of radio waves in space, and there is provided a variable-scanning-speed mechanical driving unit for increasing the scanning speed in the case of a warning mode aimed at the prevention of a collision, and for decreasing the scanning speed in the case of a follow-up mode aimed at follow-up traveling. Accordingly, when the vehicle-mounted radar apparatus in accordance with the present invention is used as the following-distance warning apparatus and the following-distance controlling apparatus, it is possible to obtain parameters of data, i.e., such as resolutions of the relative distance and relative velocity and the data updating period, which are optimally suited for one's own vehicle and the driver in correspondence with the situation during actual use of the apparatus.

In accordance with the vehicle-mounted radar apparatus according to claim 2 of the present invention, data is acquired for each direction while continuously switching over in a range of a scanning angle a direction of an antenna unit for transmission or reception of radio waves in space to a plurality of fixed directions, and there is provided a switching unit for shortening a data acquisition time per direction in the case of a warning mode aimed at the prevention of a collision, and for extending the data acquisition time per direction in the case of a follow-up mode aimed at follow-up traveling. Accordingly, it is possible to attain a compact and simplified apparatus by omitting the mechanical driving unit. At the same time, it is possible to obtain parameters of data, i.e., such as resolutions of the relative distance and relative velocity and the data updating period, which are optimally suited for one's own vehicle and the driver in correspondence with the situation during actual use of the apparatus.

What is claimed is:

1. In a vehicle-mounted radar apparatus which acquires data while continuously scanning a transmitter/receiver unit through a scanning angle, the improvement comprising:

a variable-scanning-speed mechanical driving unit for optimizing a scanning speed of the transmitter/receiver unit in accordance with external stimuli, such that a scanning speed in a collision mode is greater than a scanning speed in a following mode.

2. In a vehicle-mounted radar apparatus which acquires data in each of a plurality of discrete directions by continuously switching the direction of transmission/reception of a transmitter/receiver unit, the improvement comprising:

a switching unit for controlling a data acquisition time per discrete direction such that a data acquisition time in a first mode is less than that in a second mode.

3. In a vehicle-mounted radar apparatus which acquires data while changing a direction of transmission/reception of a transmitter/receiver unit, the improvement comprising:

a control unit for controlling a data updating period and data resolution such that the data updating period in a first mode is shorter than that in a second mode whereas the data resolution in said first mode is less than that in said second mode.

* * * * *